United States Patent Office 3,719,022
Patented Mar. 6, 1973

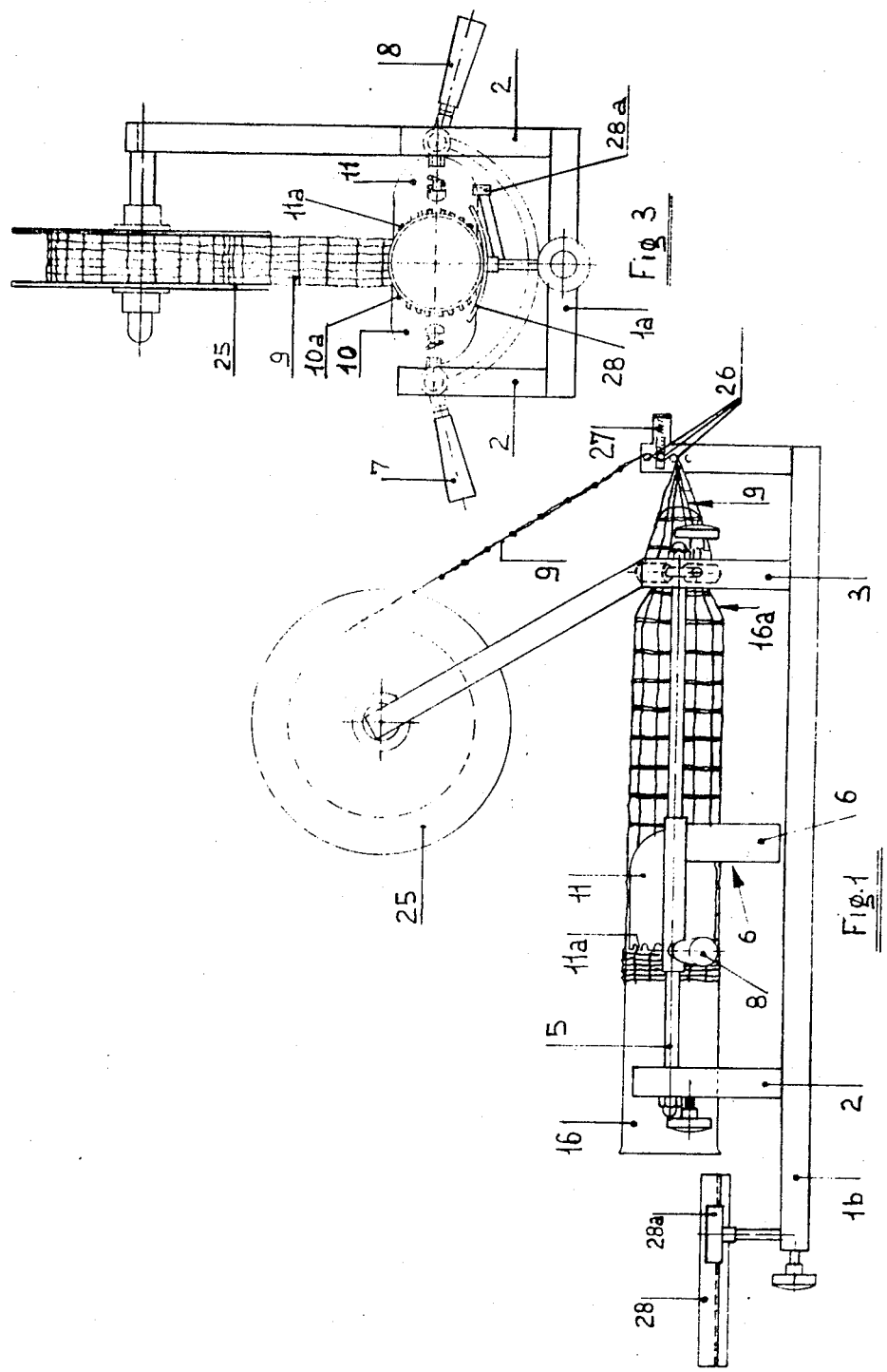

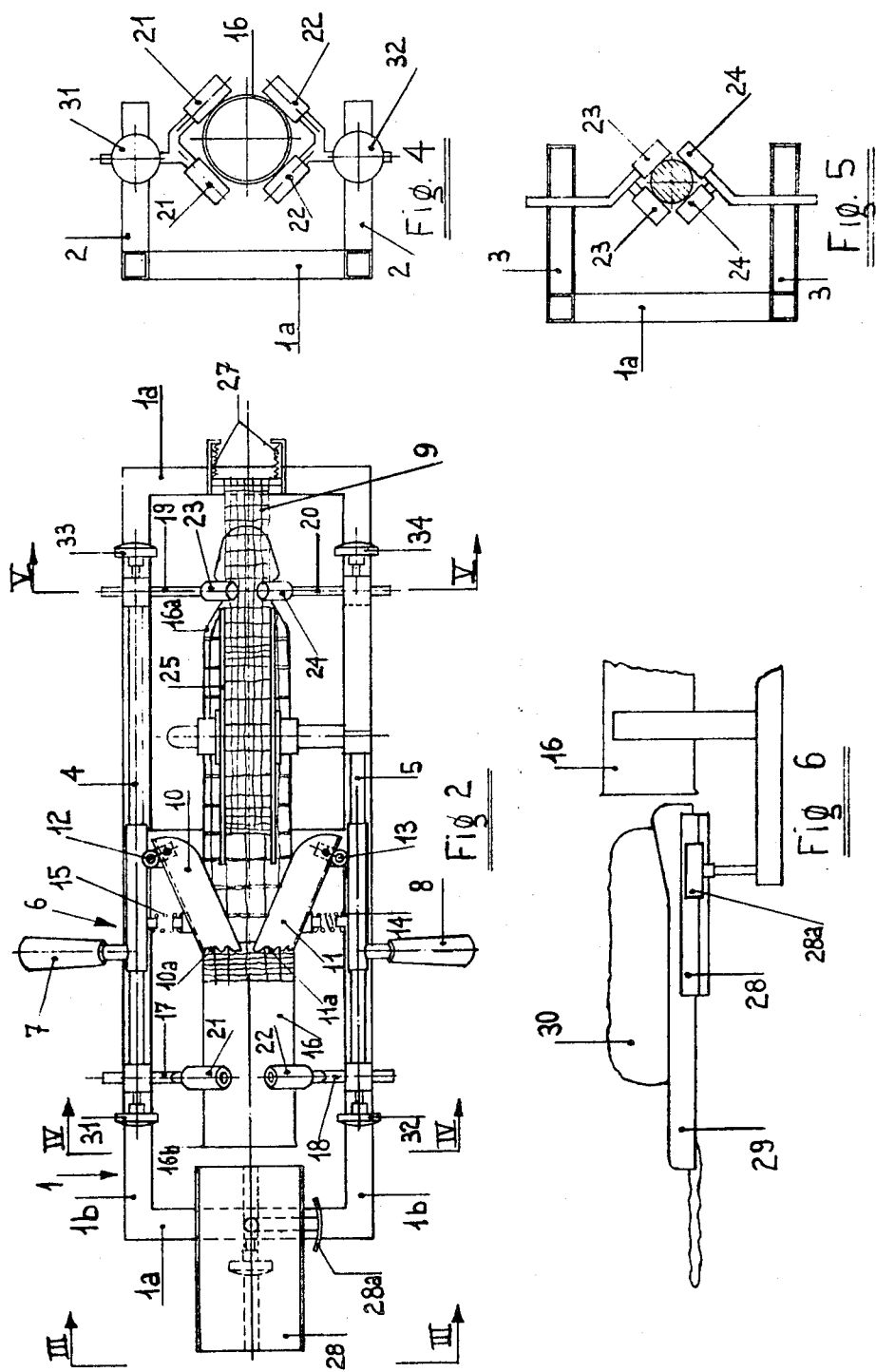

3,719,022
DEVICE FOR FILLING FOODSTUFF INTO NETTED CONTAINERS
Vittoria Cherio and Giuseppe Mignone, both of Valle San Matteo, Cisterna d'Asti, Italy
Filed Nov. 4, 1971, Ser. No. 195,619
Claims priority, application Italy, Nov. 7, 1970, 70,711/70
Int. Cl. B65b 5/04
U.S. Cl. 53—255
6 Claims

ABSTRACT OF THE DISCLOSURE

A device for filling foodstuff into netted containers, which comprises a filler tube centrally positioned on a supporting frame, the tube being telescopically mounted and having thereabout a continuously fed and gathered netting which, as the ram of the tube extrudes the foodstuff therefrom, disengages itself from the tube and becomes uniformly filled with the extrudate foodstuff.

FIELD OF THE INVENTION

The present invention relates to devices for filling or stuffing of foodstuff, particularly roasts and the like, in netting material, preferably of tubular shape.

BACKGROUND OF THE INVENTION

Usually, the filling of foodstuff, as specified above, is carried out by means of a tubular element on which the container net is previously telescoped. The foodstuff which has to be inserted into the net, is introduced in the interior of the tubular element and the filling operation is carried out by extruding or ejecting the foodstuff from the tubular element and by simultaneously withdrawing from around the latter a portion of the netting corresponding to the volume of the foodstuff. This portion of netting is then cut off and the two ends are closed by fastening or binding, so to retain the foodstuff therein.

In order to improve this usually manual process, it has already been proposed to support the tubular element on a proper support and to effect the extrusion of the foodstuff in the net by means of a ram. In this manner the net which is initially telescoped on the tubular element, is pre-closed at one end and, as a result of the thrust action of the ram, is withdrawn from the tubular element simultaneously with the foodstuff. As soon as the foodstuff has been fully ejected from the tubular element, the net is severed and tied in the vicinity of the cut. Both these processes for introducing foodstuff in a container net are possessed of considerable disadvantages.

A first disadvantage resides in that the net is not fed continuously from the tubular element, so that after a few stuffing operations, the number of which depends upon the length of the tubular element, it is necessary to telescope a fresh length of netting on the tubular element. A further disadvantage is due to the presence of considerable waste of netting material, thus causing an increase in manufacturing costs. Furthermore, both the filling operation and the placing of the net on the tubular element require a considerable time, which implies a considerable waste of labor. Still another disadvantage is due to the fact that in the case of filling of foodstuff having a pasty consistency, the latter is stuffed irregularly, because of the pressure changes during the extruding operation.

SUMMARY OF THE INVENTION

It is therefore the main object of the present invention to provide a device for filling of foodstuff, particularly roasts and the like, in tubular nets, which permits the elimination of the time consuming stage of the placement of the net, thus increasing the operational efficiency of the process.

It is another object of the invention to provide a device in which the waste in netting material is practically eliminated, thereby making the process more economical.

Still another object of the invention is to provide a manually operated device which permits an extremely rapid operation to obtain a uniform and perfectly packaged product.

Finally, a further object of the invention is to provide a device which permits improvements in the characteristics of the products, by allowing the formation of stuffed products having a varied volume and dimensions.

Briefly stated, the present invention provides a device for filling foodstuff into nets, which comprises a support bench having a frame provided with lateral uprights. These uprights have sliding guides for a manually operated ram provided with drag jaw means to drag the netting material. Two end stands are provided with sliding rollers and serve to support a tubular element centrally positioned with respect to the frame and to the drag means. The tubular element has a blind end with a groove therein for receiving the rollers of the stand and an open end for the introduction of the foodstuff to be filled. The tubular element is, furthermore, telescoped by the container net which is fed continuously by a delivery spool at said blind end, in order to be gathered or accumulated in the direction of the opening of the tubular element or tube, ready for use and in a quantity corresponding to the length of the tube for each advance stroke of the ram.

The operation of the device is effected by telescoping a short portion of the netting on the blind end of the tube. The ram is then moved toward this end of the tube, so that the drag means engage the portion of the net which telescopes the tube.

Further movement of the ram towards the opening of the tube causes the net to slide on the tube and, at the same time, to unwind from the delivery spool. The ram is then returned to its original position and another drag operation is accomplished, in order to accumulate in the vicinity of the opening of the tube a quantity of netting equal to the length of the tube. The net, thus accumulated, is pulled over the foodstuff contained in the tube.

In the event that a change of tube size is necessary, the tube may be readily withdrawn from the roller stands, after having previously released the rollers support, and replaced with another tube having the desired diameter, which new tube will be retained in position after having adjusted the rollers of the stands to conform to the new diameter.

THE DRAWINGS

These and other features and advantages of the present invention will become more apparent from the following detailed description of an embodiment thereof, with reference to the accompanying illustrative drawings, herein presented solely for purpose of non-limitative illustration, in which:

FIG. 1 is a side elevational view of the filling device of the invention;

FIG. 2 is a top planar view of the device of FIG. 1;

FIG. 3 is a front elevational view taken in the direction of the arrows III—III of FIG. 2;

FIGS. 4 and 5 are cross-sectional views taken along lines IV—IV and V—V, respectively, of FIG. 2; and FIG. 6 is diagrammatic view showing the shovel for feeding the foodstuff into the net and illustrating the way of using this shovel relative to the tube containing the net and the foodstuff.

DETAILED DESCRIPTION OF THE INVENTION

Referring now to the accompanying drawings, the frame 1 of the device comprises cross-members 1a and longitudinal members 1b, connected in such a way as to form substantially a rectangle. The frame carries lateral upright 2 and 3 which support longitudinal guides 4 and 5 located in the vicinity of the longitudinal members 1b. On the guides is mounted slidably a ram, indicated generally at 6, said ram being provided with operating handles 7 and 8, on which a suitable force is exerted to produce an axial sliding movement of the ram in the sliding guides.

Ram 6 carries drag means for the filling net 9. Said drag means include two jaws 10 and 11, preferably made of elastic, flexible material, connected to the ram by means of pins 12 and 13 in such a way as to be pivotable in the horizontal plane, each one in opposition to the action of their respectively corresponding springs 14 and 15.

Each of the two jaws 10 and 11 is provided with an operative end 10a, 11a having teeth which are suitably chamfered in order to be in a position to work well on the texture of the netting 9 and to allow the jaw to be used on the net when the ram is moved in its forward stroke (from right to left in the drawing) without deforming the net. Centrally located, relative to said frame and said jaws, is a tube 16 which is supported by a couple of end stands 17–18, 19–20, each stand including rollers 21–22, 23–24 positioned at 90 degrees to each other. The rollers form in this way a support member which maintains the tube in a perfectly centered position and allows eventual movements of the tube in the longitudinal axial direction.

However, such movements are limited by the fact that the rollers and the rear stands 19–20 engage a groove 16a located at the blind end of the tube. On this blind end, which is suitably rounded and cone-shaped, is telescoped the net 9 which unwinds continuously from a delivery or feeder spool 25 positioned preferably above the tube. Said net passes through tension rollers 26 (three are shown), at least one of which is subject to the action of springs 27. The groove 16a has a cone-shaped contour mating tube 16 which is also provided with a slight axial taper, of the order of one or two degrees, and terminates with a slight flare 16b at the outlet.

As described hereinabove, the net is pulled over the tube and a portion of the net, corresponding to the length of the tube, is accumulated in the direction of the outlet 16b as the ram 6 is operated on a forward stroke (from right to left, with reference to the drawings).

In order to allow the net to pass beneath the rollers 23–24 of the stands 19–20, the tube is slightly moved back, i.e., to the right, with reference to the drawings. To this purpose, on the front part of the frame there is mounted a rotatable element 28 which, as it will be explained more in detail herebelow, serves to support a shovel 29 which introduces in the tube the foodstuff 30 which has to be stuffed in the net. The rotatable element 28 may be rotated, for instance, in the counterclockwise direction and carries associated thereto a shoe 28a which serves to engage the edge of the tube and push it rearwardly relative to the rollers 23–24, after having first released at least one of the pressure screws 33–34. After the net 9, which is unwound from spool 25, has been passed beneath the rollers 23–24, the shoe 28a is straightened. This operation is repeated each time the quantity of accumulated netting material is exhausted.

Thus, the mode of operation of the device is as follows:

The net is pulled over the tube in the region of its blind end. Subsequently, by actuating one or more times the ram 6, a quantity of netting material equal to one or more times the length of the tube 16 is accumulated in the region of its front opening 16b. The shovel 29 (with the foodstuff 30 to be stuffed) is then introduced in the tube and the shovel, the foodstuff and concurrently a portion of the netting material corresponding to the volume to be ultimately stuffed in the net, are withdrawn and then said portion of netting is cut and is tied at both ends. The operation is repeated after having previously advanced one or more times the ram and after having accumulated a fresh amount of netting material in the region of the opening of the tube.

If necessary, the tube 16 may be replaced by another one of different diameter. To this purpose, the stands 17–18, 19–20 are adjustable and positionable by means of the pressure screws 31–32 and 33–34.

It is to be understood that the principle of the invention remains unchanged, regardless of alterations and modifications in the embodiments of the device and in the operational procedure. Thus, for example, the jaw means for dragging the net could be more than two and the delivery spool 25 may be replaced by any other feeding mechanism, without departing from the spirit and the scope of the invention as hereinabove described and hereinafter claimed.

What is claimed and is desired to secure by Letters Patent of the United States is:

1. A device for filling of foodstuff into a receiving net, which comprises: a support frame; lateral uprights on said frame; sliding guides on said uprights; a reciprocating ram slidable on said guides; drag jaw means connected to said ram and serving to drag said net; a pair of end stands provided with sliding rollers; a filling tube supported by said rollers in a central position with respect to said frame and to said drag means; the tube having a blind end with a groove for receiving said rollers and an opposite open end for the introduction of said foodstuff in said net, and capable of being telescoped by said net; and feeding means for the continuous delivery of said net at said blind end of said tube; the quantity of net to be accumulated corresponding to the length of said tube for each forward stroke of said ram.

2. The device of claim 1, wherein said jaw means include at least two jaws connected to said ram by means of pins, so as to be pivotable in the horizontal plane, each one against the action of a corresponding spring, each of said jaws carrying an operative end provided with teeth for engaging said net during the forward strokes of the ram.

3. The device of claim 1, wherein said end stands are provided with rollers and are adjustable in order to allow employment of tubes having different diameter.

4. The device of claim 1, wherein said feeding means is a spool carrying said net and located above said tube, the net being unwound from said spool by passing through a plurality of tension rollers, at least one of which is subjected to the action of a spring.

5. The device as defined in claim 1, wherein it further includes, located in front of said tube, a rotatable element; a shovel supported by said rotatable element for introducing into said tube said foodstuff; a shoe on said rotatable element which, upon rotation of said rotatable element, is brought in contact with said tube in order to cause said tube to move rearwardly in the longitudinal axial direction thereof.

6. The device of claim 1, wherein said jaws of said drag means are made of elastically flexible material.

References Cited

UNITED STATES PATENTS 3,342,017   9/1967   Yerkey   53—255
3,529,401   9/1970   Sartore et al.   53—197

TRAVIS S. McGEHEE, Primary Examiner

U.S. Cl. X.R.

53—197, 390